US012646831B2

(12) United States Patent
Akhavan-Toyserkani

(10) Patent No.: US 12,646,831 B2
(45) Date of Patent: Jun. 2, 2026

(54) AUTOMATED ALIGNMENT OF AN ANTENNA'S FRAME OF REFERENCE TO THAT OF A TRANSIT CRAFT

(71) Applicant: Hughes Network Systems, LLC, Germantown, MD (US)

(72) Inventor: Kasra Akhavan-Toyserkani, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 476 days.

(21) Appl. No.: 18/169,451

(22) Filed: Feb. 15, 2023

(65) Prior Publication Data

US 2024/0275039 A1 Aug. 15, 2024

(51) Int. Cl.
*H04B 7/0426* (2017.01)
*H01Q 3/08* (2006.01)

(52) U.S. Cl.
CPC .............. *H01Q 3/08* (2013.01); *H04B 7/043* (2013.01)

(58) Field of Classification Search
CPC . H01Q 3/08; H01Q 1/125; H01Q 1/28; H04B 7/043; H04B 7/18508
See application file for complete search history.

(56) References Cited

U.S. PATENT DOCUMENTS

2011/0285590 A1* 11/2011 Wellington .............. G01S 19/53
342/417
2012/0002973 A1* 1/2012 Bruzzi ............... H01Q 13/0208
343/781 R 2015/0200449 A1* 7/2015 Sleight .................... H01Q 1/28
342/352
2019/0319353 A1* 10/2019 Sleight .................... H01Q 3/08
2021/0249767 A1* 8/2021 Greenwood ......... H01Q 21/061
2022/0416846 A1 12/2022 Merrell
2024/0154652 A1* 5/2024 McCormick .......... H04W 16/28

OTHER PUBLICATIONS

International Search Report and Written Opinion for PCT/US2024/015170 mailed Jun. 24, 2024, 13 pages.

* cited by examiner

*Primary Examiner* — Kenneth T Lam
(74) *Attorney, Agent, or Firm* — Kilpatrick Townsend & Stockton LLP

(57) ABSTRACT

Techniques are described for aligning an antenna's frame of reference to that of a transit craft without relying on precise physical antenna alignment during installation. For example, the antenna is installed on the craft in coarse alignment with the craft's three-dimensional reference frame. The antenna is initially steered based on obtaining ephemeris information for a radiofrequency (RF) node and receiving craft attitude and location information from an on-craft navigation system (OCNS). The antenna finds and locks onto an RF signal from the RF node and uses closed-loop tracking to optimize the antenna pointing to maximize signal quality. An alignment mapping is registered based on a misalignment between the optimized antenna pointing and the craft attitude as reported by the OCNS. The alignment mapping can be subsequently exploited to translate real-time attitude data from the OCNS for high-precision pointing and tracking by the antenna.

20 Claims, 5 Drawing Sheets

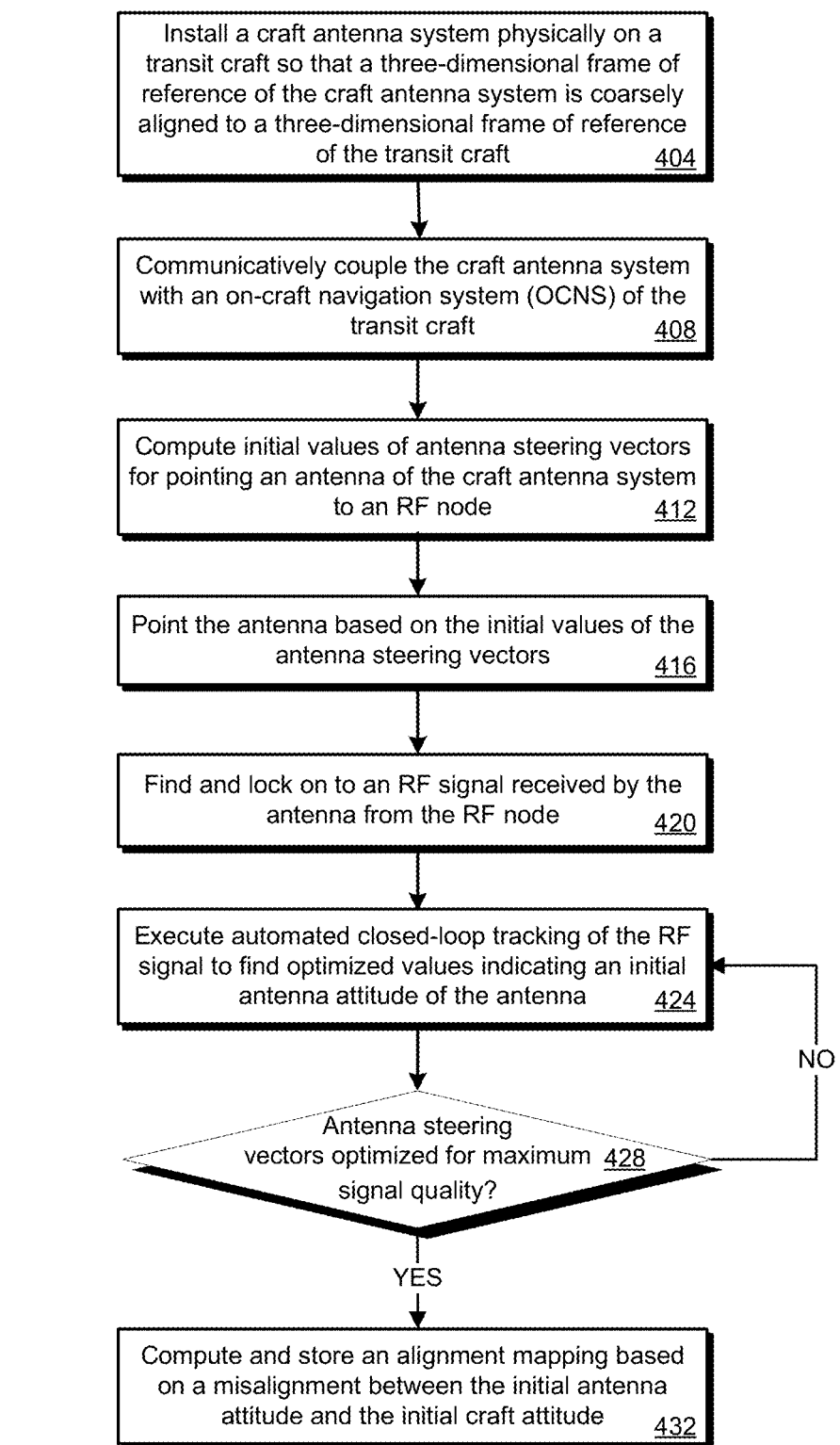

400

Install a craft antenna system physically on a transit craft so that a three-dimensional frame of reference of the craft antenna system is coarsely aligned to a three-dimensional frame of reference of the transit craft                404

Communicatively couple the craft antenna system with an on-craft navigation system (OCNS) of the transit craft                408

Compute initial values of antenna steering vectors for pointing an antenna of the craft antenna system to an RF node                412

Point the antenna based on the initial values of the antenna steering vectors                416

Find and lock on to an RF signal received by the antenna from the RF node                420

Execute automated closed-loop tracking of the RF signal to find optimized values indicating an initial antenna attitude of the antenna                424

Antenna steering vectors optimized for maximum 428 signal quality?

NO

YES

Compute and store an alignment mapping based on a misalignment between the initial antenna attitude and the initial craft attitude                432

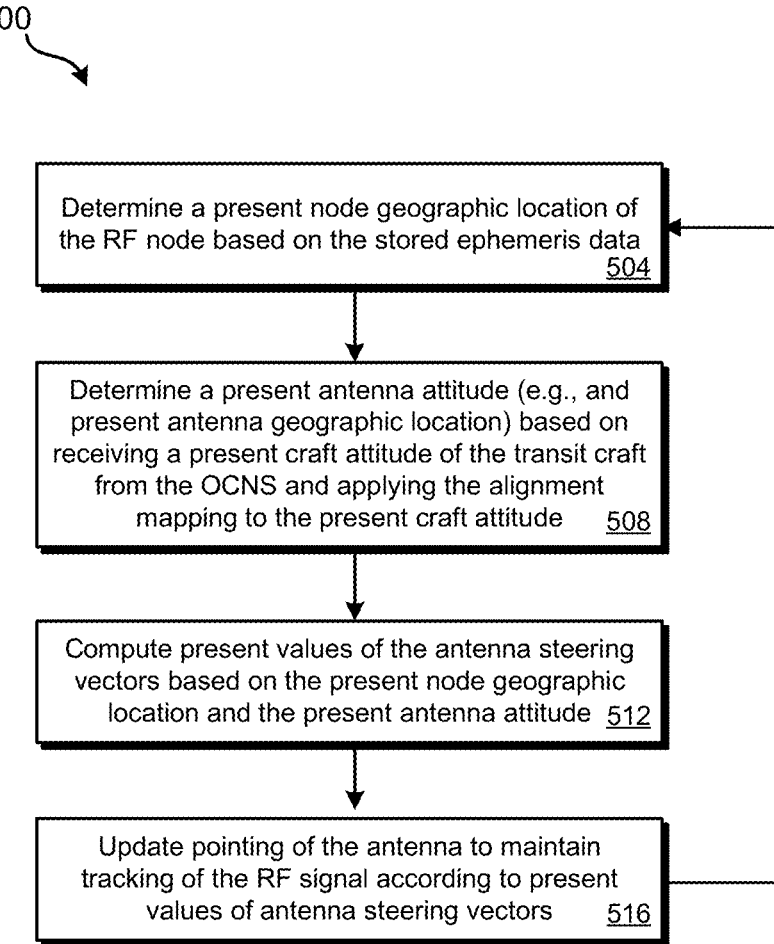

Determine a present node geographic location of
the RF node based on the stored ephemeris data
504

Determine a present antenna attitude (e.g., and
present antenna geographic location) based on
receiving a present craft attitude of the transit craft
from the OCNS and applying the alignment
mapping to the present craft attitude     508

Compute present values of the antenna steering
vectors based on the present node geographic
location and the present antenna attitude  512

Update pointing of the antenna to maintain
tracking of the RF signal according to present
values of antenna steering vectors     516

FIG. 5

AUTOMATED ALIGNMENT OF AN ANTENNA'S FRAME OF REFERENCE TO THAT OF A TRANSIT CRAFT

BACKGROUND

Aircraft and other types of transit craft often include at least one antenna for providing in-transit communications via one or more radiofrequency (RF) communication links between the transit craft and one or more RF network nodes. For example, an aircraft can have one or more on-board antennas to provide in-flight communications to passengers and crew members via one or more RF links with one or more communication satellites. As the transit craft changes position, sustaining stable RF communications can involve continually re-pointing the antenna in the direction of the RF network node to maintain RF signal tracking. Antenna pointing typically relies on algorithms that direct the antenna to an optimal pointing direction that yields a maximized signal to noise ratio (SNR). In context of satellite communications, such algorithms tend to use the ephemeris information for the satellite plus present geographic location (e.g., the craft's present position) and attitude (pitch, roll, and yaw) information to compute the steering vectors; and the antenna can be mechanically and/or electronically steered based on the algorithm output.

The real-time attitude information of the antenna can be conventionally obtained in one of two ways. One way is to integrate an inertial navigation system (INS), or the like, in the antenna (e.g., in the radome), such that the antenna can monitor its own attitude in real time. However, such an approach may not be acceptable in many instances, such as where integrating a dedicated INS adds excessive cost, weight, or size to the antenna. Another way is for the antenna to receive real-time attitude information from an INS integrated with the transit craft. However, such an approach conventionally relies on precise physical alignment (e.g., precise installation, bore-sighting, etc.) between the three-dimensional frame of reference of the transit craft and the three-dimensional frame of reference of the antenna, which can be time-consuming, expensive, and may rely on specialized equipment.

SUMMARY

Embodiments described herein include systems and methods for aligning an antenna's frame of reference to that of a transit craft without relying on precise physical antenna alignment during installation. For example, an antenna system is physically installed on a transit craft in coarse alignment with the three-dimensional reference frame of the transit craft. The antenna system is initially steered based on obtaining ephemeris information for a radiofrequency (RF) node and receiving attitude and location information from an on-craft navigation system (OCNS) of the transit craft. The antenna system finds and locks onto an RF signal from the RF node and uses closed-loop tracking to optimize the antenna pointing to maximize the signal quality of the RF signal. An alignment mapping is registered based on a misalignment between the optimized antenna pointing and the craft attitude as reported by the OCNS. The alignment mapping can be subsequently exploited to translate real-time attitude data from the OCNS for pointing of the craft antenna system, resulting in high-precision pointing and tracking without relying on precise physical installation of the antenna system on the transit craft.

According to one set of embodiments, a craft antenna system is provided. The system includes: a data store having, stored in non-volatile memory, ephemeris data for a RF node of a RF communication system; an antenna pointer to point an antenna based on antenna steering vectors; and an antenna control unit in communication with the data store, having an input data interface to communicatively couple with an on-craft navigation system (OCNS) of a transit craft, having an output data interface to couple with the antenna pointer. The antenna control unit is configured to operate in an alignment mode, to: compute initial values of the antenna steering vectors for pointing an antenna to the RF node, the computing being based on determining an initial node geographic location of the RF node from the ephemeris data, and based on receiving an initial craft attitude and location of the transit craft from the OCNS; direct the antenna pointer, via the output data interface, to point the antenna based on the initial values of the antenna steering vectors; find and lock on to an RF signal received via the antenna from the RF node; execute automated closed-loop tracking of the RF signal to find optimized values of the antenna steering vectors based on maximizing a signal quality of the RF signal, the optimized values indicating an initial antenna attitude and location of the antenna; compute an alignment mapping based on a misalignment between the initial antenna attitude and location and the initial craft attitude and location; and output the alignment mapping for non-volatile storage in the data store.

In some such embodiments, the antenna control unit is further configured to operate in a dynamic pointing mode to dynamically update pointing of the antenna during transit of the transit craft to maintain tracking of the RF signal by: determining a present node geographic location of the RF node based on the stored ephemeris data; determining a present antenna attitude and location based on receiving a present craft attitude and location of the transit craft from the OCNS and applying the alignment mapping to the present craft attitude; computing present values of the antenna steering vectors based on the present node geographic location and the present antenna attitude and location; and directing the antenna pointer, via the output data interface, to point the antenna based on the present values of the antenna steering vectors.

In some such embodiments, a craft antenna system is provided that includes a radome; an antenna housed within the radome; a mounting structure configured to physically mount the radome and the antenna on a transit craft so as to coarsely align a three-dimensional frame of reference of the antenna to a three-dimensional frame of reference of the transit craft; and the antenna steering subsystem at least partially housed within the radome.

According to another set of embodiments, a method is provided. The method includes: installing a craft antenna system physically on a transit craft so that a three-dimensional frame of reference of the craft antenna system is coarsely aligned to a three-dimensional frame of reference of the transit craft; communicatively coupling the craft antenna system with an on-craft navigation system (OCNS) of the transit craft; computing initial values of antenna steering vectors for pointing an antenna of the craft antenna system to an RF node of an RF communication network, the computing being based on determining an initial node geographic location of the RF node from stored ephemeris data, and based on receiving an initial craft attitude and location of the transit craft from the OCNS; pointing the antenna based on the initial values of the antenna steering vectors; finding and locking on to an RF signal received by the antenna from the RF node; executing automated closed-loop tracking of the RF signal to find optimized values of the antenna steering vectors based on maximizing a signal quality of the RF signal, the optimized values indicating an initial antenna attitude and location of the antenna; computing an alignment mapping based on a misalignment between the initial antenna attitude and location and the initial craft attitude and location; and storing the alignment mapping in a non-volatile data store accessible to the craft antenna system. In some embodiments, the method further includes updating pointing of the antenna during transit of the transit craft to maintain tracking of the RF signal by: determining a present node geographic location of the RF node based on the stored ephemeris data; determining a present antenna attitude and location based on receiving a present craft attitude and location of the transit craft from the OCNS and applying the alignment mapping to the present craft attitude and location; and computing present values of the antenna steering vectors based on the present node geographic location and the present antenna attitude and location.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 4 shows a flow diagram of an illustrative method for operating a craft antenna system in an alignment mode, according to embodiments described herein.

FIG. 5 shows a flow diagram of an illustrative method for operating a craft antenna system in a dynamic pointing mode, according to embodiments described herein.

DETAILED DESCRIPTION

Transit craft, such as aircraft, often include at least one antenna for providing in-transit communications via one or more radiofrequency (RF) communication links between the transit craft and one or more RF network nodes, such as one or more communication satellites. As the transit craft changes position, sustaining stable RF communications can involve continually re-pointing the antenna in the direction of the RF network node to maintain RF signal tracking. The pointing can be mechanical (e.g., by using mechanical steering hardware) and/or electrical (e.g., by using a phased array antenna). Antenna pointing typically relies on algorithms that direct the antenna to an optimal pointing direction that yields a maximized signal to noise ratio (SNR). To accurately point the antenna at a particular RF network node, such a pointing algorithm relies on knowledge of the present geographic location of the RF network node, as well as the present geographic location and attitude (pitch, roll, and yaw) of the antenna.

Figure 1:
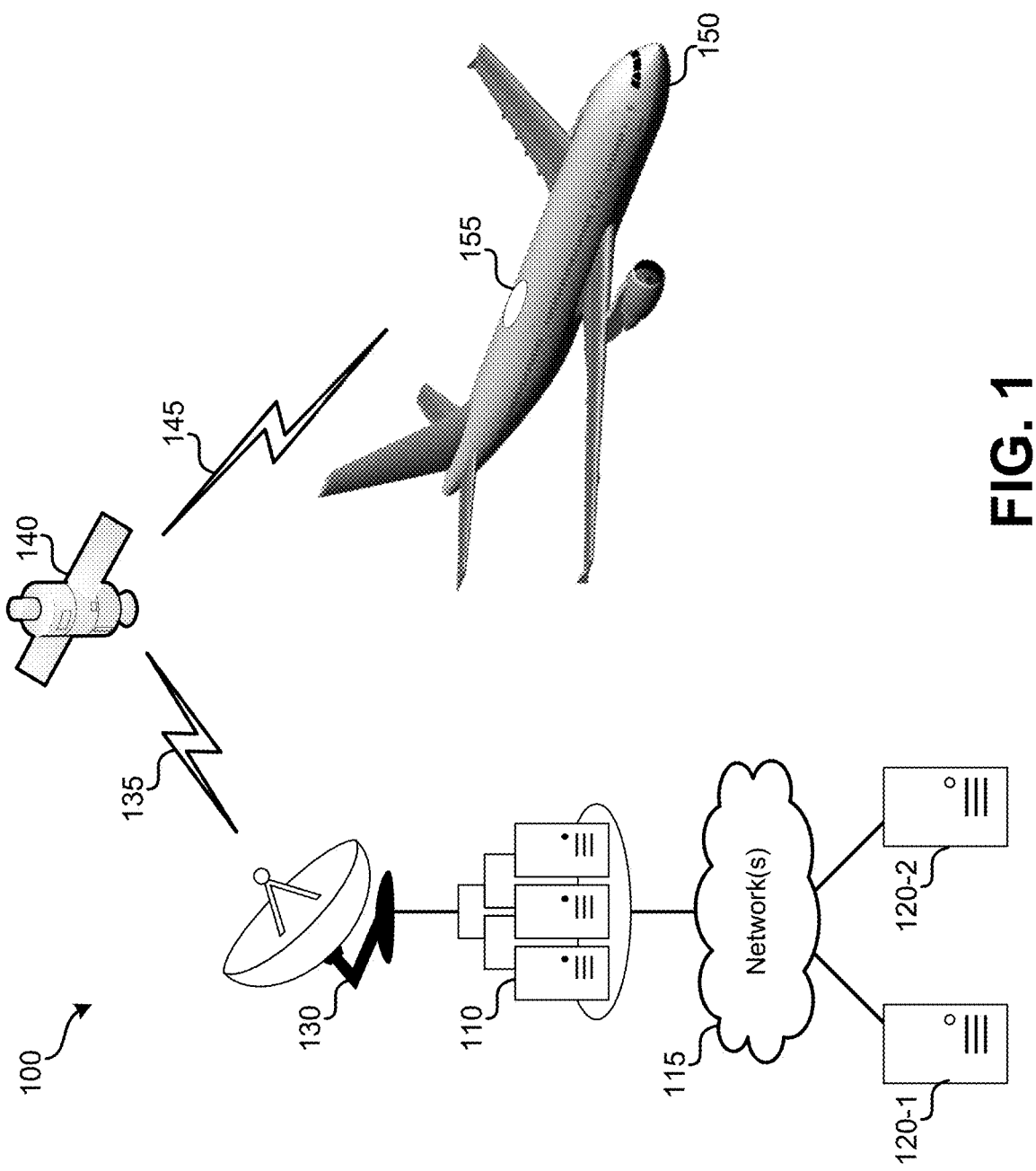
FIG. 1 shows an example of a radiofrequency (RF) communication environment in which a transit craft is in communication with a communication satellite.

For context, FIG. 1 shows an example of a radiofrequency (RF) communication environment 100 in which a transit craft 150 is in communication with a communication satellite 140. Communication environment 100 can include a gateway system 110, network(s) 115, data systems 120 (e.g., 120-1, 120-2), gateway satellite antenna 130, satellite 140, transit craft 150, and craft antenna system 155. The gateway system 110 can be an implementation of a ground Earth station (GES) teleport gateway. Gateway system 110 may serve as a bridge or gateway between a satellite communication network and the one or more networks 115. For example, the network(s) 115 can include the Internet, and/or any other communication networks that are public and/or private, wired and/or wireless, etc. The network(s) 115 can also be in communication with computational data systems 120, such as Internet accessible server systems. For example, the gateway system 110 can communicate with the Internet and one or more of various other public or private networks.

Gateway system 110 may use one or more satellite antennas, such as gateway satellite antenna 130, to communicate with satellite 140 via gateway-satellite communication links 135. The same or separate antennas may be used to receive data from satellite 140 and transmit data to satellite 140 via the gateway-satellite communication links 135. For example, the gateway satellite antenna 130 is used by the gateway system 110 to send forward-channel data via uplink portions of gateway-satellite communication links 135 and/or to receive return-channel data via downlink portions of gateway-satellite communication links 135. Similarly, transit craft 150 has at least one craft antenna system 155 to communicate with the satellite 140 via craft-satellite communication links 145. The same or separate antennas may be used to receive data from satellite 140 and transmit data to satellite 140 via the craft-satellite communication links 145. For example, the aircraft antenna system 155 is used to send return-channel data via uplink portions of craft-satellite communication links 145 and/or to receive forward-channel data via downlink portions of craft-satellite communication links 145.

Satellite 140 may be in low earth orbit (LEO), middle earth orbit (MEO), or geosynchronous orbit (GEO) (e.g., geostationary orbit). Satellite 140 may function as a "bent pipe." This can mean that satellite 140 receives a signal from gateway satellite antenna 130, such as forward-channel uplink data, and retransmits the signal on the same or different frequency as forward-channel downlink data over a geographical area (e.g., to transit craft 150), such as via a spot beam. Similarly, a return-channel uplink signal may be sent by a terminal (e.g., from transit craft 150) to satellite 140, which may then be sent by satellite 140 to gateway system 110 as a return-channel downlink signal to gateway satellite antenna 130.

Embodiments operate in context of a transit craft 150, which can change position relative to the satellite 140. For example, over the course of an airplane flight in which an airplane is communicating with a satellite, the geographic position of the satellite can change, and the geographic position and attitude (pitch, roll, and yaw) of the airplane can change. Sustaining reliable communications between the transit craft 150 and the satellite 140 can rely on maintaining tracking of the RF link by keeping the craft antenna system 155 pointed in the direction of the satellite. In some implementations, antenna pointing involves mechanical pointing. For example, the craft antenna system 155 can be installed on the transit craft 150 using a mechanically steerable mounting that uses electrical signals, servomotors, etc. to physically point the antenna. In other implementations, antenna pointing additionally or alternatively involves electrical pointing. For example, the craft antenna system 155 is a phased array antenna that changes phases and/or weights of signals to electrically point the antenna beam output. Defined parameters of the RF communications can determine a desired level of pointing precision. For example, maintaining broadband satellite communications with a high signal-to-noise ratio (SNR) may rely on antenna pointing that uses real-time tactical-grade inertial navigation system to provide attitude data.

In context of satellite communications, antenna pointing algorithms tend to use ephemeris information for the satellite 140 (from which a present location of the satellite can be derived) plus real-time monitoring of the location and attitude of the craft antenna system 155 to compute steering vectors for the craft antenna system 155. The craft antenna system 155 can be steered (electrically and/or mechanically) according to the computed steering vectors. Real-time attitude information of the craft antenna system 155 can be conventionally obtained in one of two ways. One way is to integrate an inertial navigation system (INS), or the like, in the craft antenna system 155, such that the craft antenna system 155 can monitor its own attitude in real time. However, such an approach may not be acceptable in many instances, such as where integrating a dedicated INS adds excessive cost, weight, or size to the craft antenna system 155.

Another way is for the craft antenna system 155 to receive real-time attitude information from an on-craft navigation system (OCNS), such as an INS integrated with the transit craft 150. Conventionally, use of OCNS information relies on ensuring a very precise physical alignment between the three-dimensional frame of reference of the transit craft 150 and the three-dimensional frame of reference of the craft antenna system 155. Achieving such precise alignment involves careful installation of the craft antenna system 155 on the transit craft 150, typically including use of specialized equipment for bore-sighting, leveling, etc. This type of installation can be relatively time-consuming and expensive and must be re-performed each time the craft antenna system 155 is replaced or removed for servicing. Further, such installation often involves careful design of craft-specific mountings and can be particularly difficult on transit craft 150 having more contoured surfaces, such as smaller aircraft, etc.

Embodiments described herein include techniques for automatically registering an alignment mapping between a frame of reference of the craft antenna system 155 to that of an OCNS of the transit craft 150. For example, the craft antenna system 155 is installed on the transit craft 150 in coarse alignment with the three-dimensional frame of reference of the transit craft 150. The craft antenna system 155 initially steers based on obtaining ephemeris information for the satellite 140 and receiving present craft attitude vectors and present craft location from the OCNS, and finds and locks onto a receive RF signal from the satellite 140. The craft antenna system 155 uses closed-loop tracking of the acquired RF signal to optimize its antenna pointing vectors. An alignment mapping is registered based on a misalignment between the optimized antenna pointing vectors and the present craft attitude vectors. The alignment mapping can be subsequently exploited to translate real-time attitude and location data reported by and received from the OCNS for pointing of the craft antenna system 155. Such techniques can provide high-precision pointing and tracking without relying on precise physical installation of the craft antenna system 155 on the transit craft 150.

Although the illustrated environment 100 shows an airplane, embodiments described herein can be applied to a craft antenna system 155 installed on any transit craft 150 with an integrated OCNS that produces sufficiently precise real-time attitude data to support a desired pointing accuracy for the craft antenna system 155. For example, the transit craft 150 can be any aircraft (e.g., airplane, helicopter, drone, etc.), watercraft (e.g., cruise ship, barge, yacht, etc.), on-road and/or off-road vehicle (e.g., train, car, truck, bus, recreational vehicle (RV), motorcycle, etc.), etc. The transit craft 150 can also be driven, hauled, carried, and/or otherwise transited by a human driver, animal, mechanical device or structure, etc. in a non-autonomous, partially autonomous, or fully autonomous manner, etc. Further, although the illustrated environment 100 shows the transit craft 150 in communication with a satellite 140, embodiments described herein can be applied to any suitable type of RF communication node for which a moving transit craft 150 continually re-points its craft antenna system 155 to maintain RF tracking with the RF communication node. For example, the transit craft 150 may be in communication (via the craft antenna system 155) with a cellular network tower.

Figure 2:
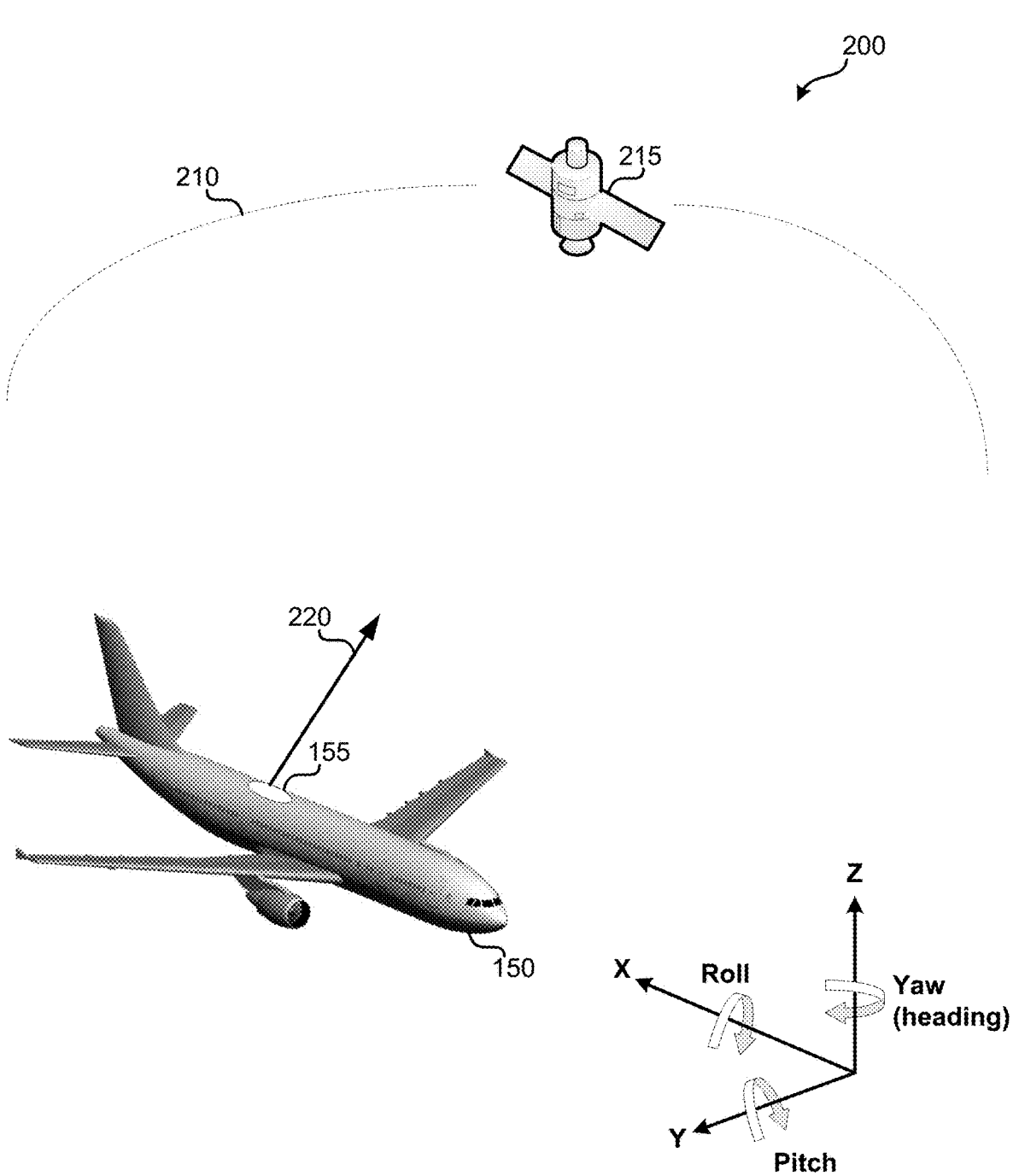
FIG. 2 illustrates several conventions used herein in context of an RF communication environment similar to that of FIG. 1.

For added context, FIG. 2 illustrates several conventions used herein in context of an RF communication environment 200 similar to that of FIG. 1. The environment 200 includes a transit craft 150 (e.g., airplane) with a craft antenna system 155 in communication with an RF node 215 of a RF communication network (e.g., a satellite). Each of the craft antenna system 155 and the RF node 215 have respective geographic locations and attitudes. Embodiments described herein generally assume that the RF node 215 is far away from the craft antenna system 155 (i.e., they are communicating over a very long-range wireless link). In such contexts, the attitude of the RF node 215 may not be relevant to determining antenna pointing. Rather, such cases can generally assume that the RF node 215 is a point in space to which the antenna is being pointed.

The terms "ephemeris information" and "ephemeris data" are generally used interchangeably herein to refer to information indicating the geographic location of the RF node 215, or to information from which the geographic location of the RF node 215 can be deterministically derived. In some cases, the RF node 215 may have a fixed geographic location, and the ephemeris data indicates the fixed geographic location (e.g., coordinates). For example, a cellular tower may be constructed in a fixed geographic location. In other cases, the RF node 215 is in motion, such that it has a changing geographic location. In some such cases, the ephemeris data is continuously or periodically updated with the current position of the RF node 215, and the ephemeris data can be transmitted (e.g., broadcast) to aid in antenna pointing, or the like. In other such cases, the changing geographic location of the RF node 215 is along a deterministic path 210. For example, a communication satellite is typically deployed into a geosynchronous or non-geosynchronous orbit. In such cases, the ephemeris data can either indicate a present geographic location of the RF node 215, or the ephemeris data can describe the motion of the RF node 215 (e.g., path 210 and speed along the path) in sufficient detail to be usable to accurately derive the present geographic location of the RF node 215 at any time.

As described herein, the transit craft 150 and the craft antenna system 155 can each have a respective geographic location and a respective three-dimensional frame of reference. It can be generally assumed that the RF node 215 is far enough away from the craft antenna system 155, such that the transit craft 150 and the craft antenna system 155 can be considered as sharing a same geographic location. Descriptions herein refer to three-dimensional frames of reference as defined by an x-axis, a y-axis, and a z-axis. Consistent with certain standards (e.g., the Aeronautical Radio Incorporated (ARINC) 791 standard), the x-axis runs opposite to a forward direction of motion of the transit craft 150, so that rotation around the x-axis defines "roll" of the transit craft 150; the y-axis runs horizontally through the transit craft 150 and orthogonal to the x-axis and the z-axis, so that rotation around the y-axis defines "pitch" of the transit craft 150; and the z-axis runs vertically through the transit craft 150 and orthogonal to the x-axis and the y-axis, so that rotation around the z-axis defines "yaw" (or heading) of the transit craft 150. Any suitable three-dimensional frame of reference can be used for the transit craft 150 and the craft antenna system 155. The pitch, roll, and yaw (or comparable frame of reference parameters) are generally referred to herein as the "attitude." For some types of transit craft 150 (e.g., aircraft), relevant attitude data for antenna pointing includes all of pitch, roll, and yaw (i.e., the attitude of the transit craft 150 can change in all three orientations). For other types of transit craft 150, relevant attitude data may include only one or two of pitch, roll, and yaw. For example, a particular transit craft 150 may have substantially no roll, such that only its pitch and yaw tend to change.

Once the craft antenna system 155 is installed with a fixed mounting onto the transit craft 150, a change in the attitude of the transit craft 150 will cause a corresponding change in the attitude of the craft antenna system 155. However, unless the three-dimensional frame of reference of the craft antenna system 155 is precisely physically aligned to the three-dimensional frame of reference of the transit craft 150, the attitudes of the craft antenna system 155 and the transit craft 150 will not necessarily match. Techniques are described herein for generating an alignment mapping so that the attitude of the transit craft 150 can be precisely used as a proxy for the attitude of the craft antenna system 155 without relying on precise physical alignment of their respective three-dimensional frames of reference.

Pointing an antenna of the craft antenna system 155 to the RF node 215 involves computing one or more steering vectors 220. At any particular time, the steering vector(s) 220 can be computed based on some or all of a present geographic location of the RF node 215 (based on the ephemeris data), a present geographic location of the craft antenna system 155 (e.g., based on a present geographic location of the transit craft 150), and a present attitude of the craft antenna system 155 (e.g., based on a present attitude of the transit craft 150 as transformed by the alignment mapping). That information can be used to compute the steering vector 220 within the three-dimensional frame of reference of the craft antenna system 155. In some implementations, the steering vector 220 is expressed as originating at an origin of the three-dimensional frame of reference (e.g., the origin corresponding to a center of the antenna aperture, or the like) and pointing in a direction defined by an azimuth and an elevation. In other implementations, the steering vector 220 can be expressed in any suitable manner to result in desired pointing of the antenna. As one example, the steering vector 220 can be expressed as values for a set of parameters used to drive servo motors, or the like, to mechanically point a multi-axis structure on which the antenna is mounted, thereby mechanically pointing the antenna. As another example, the steering vector 220 can be expressed as values for weights to set phase shifters to electrically point an antenna beam output of a phased array antenna, thereby electrically pointing the antenna.

Figure 3:
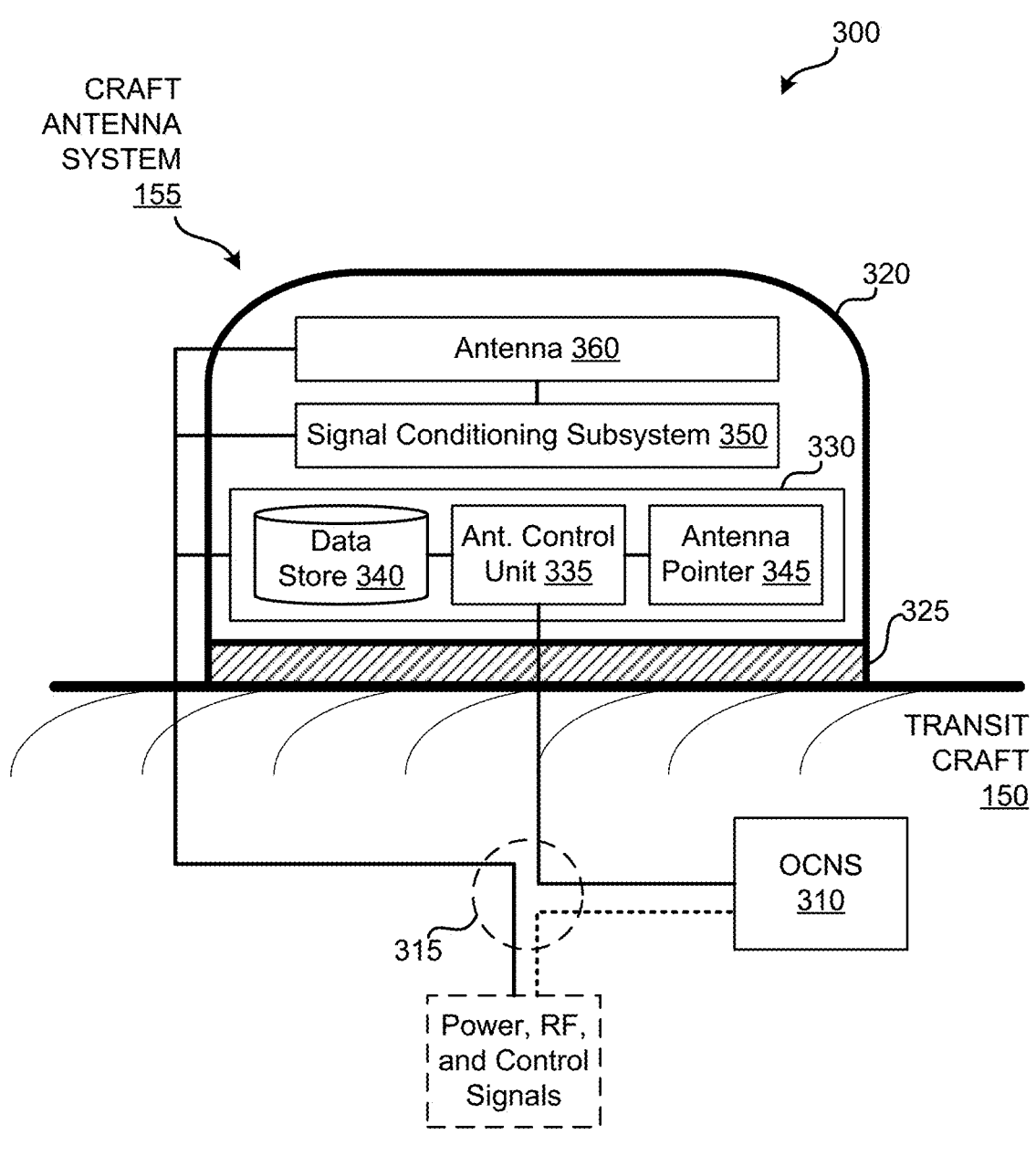
FIG. 3 shows a simplified block diagram of an antenna installation environment including a craft antenna system mounted on a transit craft, according to various embodiments described herein.

FIG. 3 shows a simplified block diagram of an antenna installation environment 300 including a craft antenna system 155 mounted on a transit craft 150, according to various embodiments described herein. As described above, embodiments herein assume that the transit craft 150 has its own on-craft navigation system (OCNS) 310. The OCNS 310 measures real-time geographic position of the transit craft 150 (e.g., using global positioning satellite (GPS) sensors) and real-time attitude of the transit craft 150 (e.g., using an internal navigation system (INS), an inertial measurement unit (IMU), etc.). The OCNS 310 outputs the real-time geographic position and attitude data for the transit craft 150 via a craft data interface 315. In some embodiments, the craft data interface 315 is a standard communication interface, at least for the type of transit craft 150. For example, where the transit craft 150 is an aircraft, the OCNS 310 can communicate via a standard ARINC interface, such as defined in the ARINC Specification 429P1-18, published Nov. 29, 2012, titled "DIGITAL INFORMATION TRANSFER SYSTEM (DITS), PART 1, FUNCTIONAL DESCRIPTION, ELECTRICAL INTERFACES, LABEL ASSIGNMENTS AND WORD FORMATS," referred to herein as "ARINC 429." As illustrated, the same or other craft data interface 315 can be used for other signaling, such as for communication of power, radiofrequency communications, and/or control signals to equipment installed on the transit craft 150. For example, the transit craft 150 may have equipment (e.g., a modem manager, MODMAN) to handle modem, server, and/or other in-transit communications functions; one or more radiofrequency units (e.g., a Ka- and/or Ku-band RF unit, KRFU); and/or other equipment. Some or all of such equipment can be installed in the transit craft 150. In some embodiments, the OCNS 310 is implemented by the MODMAN, or any other suitable equipment.

Embodiments of the craft antenna system 155 are installed on the transit craft 150. As illustrated, the craft antenna system 155 includes an antenna 360, a signal conditioning subsystem 350, and an antenna steering subsystem 330. In some embodiments, the craft antenna system 155 implements a very small aperture terminal (VSAT) communication system, such as a satellite communication (satcom) system. The antenna 360 can generally refer to the antenna aperture, radiating components (e.g., feeds, horns, etc.), etc. The signal conditioning subsystem 350 can generally include any components to condition signals received by the antenna 360 for use by downstream components (e.g., by the MODMAN, etc.) and/or to condition signals from downstream components for transmission by the antenna 360. For example, the signal conditioning subsystem 350 can include amplifiers (e.g., a high-power amplifier, a low-power amplifier, etc.), converters (e.g., a block up converter, a block down converter, etc.), polarization controllers (e.g., for Ku-band satcom implementations), filters, drivers, etc. The antenna 360 and signal conditioning subsystem 350 can be configured to transmit and receive RF signals of certain signal characteristics, such as signals communicated in one or more particular RF bands, in one or more polarization orientations, at one or more power levels, according to one or more schedules, etc.

Embodiments of the antenna steering subsystem 330 include an antenna control unit 335 and an antenna pointer 345. The antenna steering subsystem 330 also includes, and/or is in communication with, a data store 340. Embodiments of the antenna control unit 335 are configured to provide dynamic antenna pointing and RF signal tracking based at least on ephemeris data for the RF node 215 (e.g., satellite) being tracked, real-time geographic location and attitude data for the transit craft 150, and a computed alignment mapping.

The antenna control unit 335 can include one or more input data interfaces (e.g., logical and/or physical ports) at least for receiving stored data (e.g., the ephemeris data for the RF node 215 and/or the alignment mapping) from the data store 340, and for receiving the real-time geographic location and attitude data for the transit craft 150 from the OCNS 310 (via the craft data interface 315). The data store 340 can include any suitable type of non-volatile memory, such as one or more memory circuits (e.g., read-only memory (ROM), electrically erasable programmable ROM (EEPROM), etc.) solid-state drives, servers, etc. In some embodiments, the data store 340 stores the alignment mapping after it is computed. In other embodiments, the data store 340 further stores the ephemeris data for the RF node 215 being tracked. In some cases, the ephemeris data for a particular RF node is loaded to the data store 340 when the transit craft 150 is not in transit, when the craft antenna system 155 is originally being installed or the transit craft 150 or craft antenna system 155 is undergoing initial configuration or maintenance, or in some other configuration time frame. In other cases, updated ephemeris data is received periodically from the RF node 215 (or another node of the RF network) and is stored to the data store 340.

The antenna control unit 335 can also include one or more output data interfaces at least for outputting computed pointing control information (e.g., steering vectors) to the antenna pointer 345. In some embodiments, the antenna pointer 345 mechanically steers the antenna 360. In such embodiments, the antenna 360 can be mounted on a gimbal, or any other suitable structure that allows the aperture of the antenna 360 to be mechanically steered to a desired pointing direction. The mechanical steering can involve controlling servo motors, micro-electromechanical system (MEMS) components, drive systems, and/or any other suitable mechanical steering components. For example, the antenna control unit 335 can output machine code, parameter settings, and/or any other information that is usable by the antenna pointer 345 for driving mechanical steering components to implement a desired change in pointing direction of the antenna 360. In other embodiments, the antenna pointer 345 electrically steers the antenna 360. In such embodiments, the antenna 360 can be a phased array antenna, and the pointing direction of the antenna can be steered by adjusting phase shifter parameters (e.g., respective weighting values). For example, the antenna control unit 335 can output machine code, parameter settings, and/or any other information that is usable by the antenna pointer 345 for adjusting phases of the phased-array antenna 360 to manifest a desired change in pointing direction. Regardless of the type of antenna, the antenna 360 pointing can be based on any directionality scheme, such as based on a particular azimuth and elevation, a particular set of three-dimensional coordinates, etc.

In some embodiments, the craft antenna system 155 includes a radome 320, and some or all of the craft antenna system 155 components are housed within the radome 320. The radome 320 can generally be implemented as any suitable housing structure that provides desired structural and radiofrequency characteristics. For example, the craft antenna system 155 is designed to transmit and receive RF signals of particular signal characteristics (e.g., at one or more particular RF bands, polarization orientations, etc.), and embodiments of the radome 320 are made of a material that is permissive to of RF signals having at least those signal characteristics (i.e., the radome 320 does not interfere with RF operation). Further, the radome 320 can be designed (e.g., shaped and/or sized) to support structural design constraints of the transit craft 150, such as aerodynamic and/or hydrodynamic constraints, size and/or weight constraints, etc.

In some embodiments, the radome 320 houses only the antenna 360. In some embodiments, both the antenna control unit 335 and the antenna pointer 345 are also housed within the radome 320, such that both are external to the transit craft 150. In other embodiments, one or both of the antenna control unit 335 and the antenna pointer 345 are implemented internally to the transit craft 150. For example, the antenna control unit 335 and/or the antenna pointer 345 can be implemented partially or completely by a Ka/Ku-Band Aircraft Networking Data Unit (KANDU), or similar equipment of the transit craft 150.

Installation of the craft antenna system 155 on the transit craft 150 involves physically mounting the craft antenna system 155 to the transit craft 150 using mounting structures 325. The mounting structures 325 can include any suitable equipment for physically coupling the craft antenna system 155 to the transit craft 150 in a secure and stable manner, such as mounting lugs, adapter plates, etc. The mounting structures 325 can also include craft-specific fairings, and/or other structures to support aerodynamic and/or hydrodynamic functions, aesthetic functions, etc. Embodiments of the mounting structures 325 are configured to support the radome 320. For example, the radome 320 couples with (e.g., screws onto, bolts onto, friction-fits or snap-fits onto, etc.) one or more adapter structures to physically couple the radome 320 (and its housed components) with the transit craft 150 structure, and a fairing or other similar structure couples with (e.g., attaches to, fits around, etc.) the radome 320 for added functional and/or aesthetic support of the installation.

The mounting structures 325 and/or the radome 320 can include any holes, conduits, ports, connectors, and/or other components to facilitate electrical and/or communicative coupling of the craft antenna system 155 with the transit craft 150. In particular, the mounting structures 325 can include features to facilitate or permit coupling of craft antenna system 155 components with the craft data interface 315. For example, ARINC 429 describes a receive-only, two-wire interface by which the craft antenna system 155 can receive data from the OCNS 310. Some examples of other interfaces (e.g., for power, RF communications, control signals, etc.) that can be part of the craft data interface 315 are described in ARINC Characteristic 791-2, published Aug. 29, 2014, titled "MARK I AVIATION KU-BAND AND KA-BAND SATELLITE COMMUNICATION SYSTEM PART 1 PHYSICAL INSTALLATION AND AIRCRAFT INTERFACE," referred to herein as "ARINC 791."

As described herein, the antenna control unit 335 can operate in either an alignment mode or in a dynamic pointing mode. The alignment mode is used by the antenna control unit 335 to compute the alignment mapping for precisely mapping a three-dimensional frame of reference of the craft antenna system 155 to a three-dimensional frame of reference of the transit craft 150. The dynamic pointing mode is used by the antenna control unit 335 to dynamically point the antenna 360 to maintain tracking of the RF communications with the RF node 215. The antenna control unit 335 can operate in either mode at any suitable time. In some implementations, the antenna control unit 335 operates in alignment mode during initial installation of the craft antenna system 155 on the transit craft 150, and/or whenever the craft antenna system 155 is moved, removed, or replaced (e.g., for maintenance purposes). In some implementations, the antenna control unit 335 can also be operated in alignment mode for purposes of recalibration, or the like, such as according to a maintenance schedule, or on-demand. The antenna control unit 335 can normally operate in the dynamic pointing mode whenever the transit craft 150 is in transit.

As described above, the craft antenna system 155 is physically installed on the transit craft 150 using mounting structures 325. It is generally assumed that such installation is performed without using any specialized alignment equipment, such as specialized bore-sighting or leveling tools, or the like; the installation only intends to coarsely align a three-dimensional frame of reference of the craft antenna system 155 (and, accordingly, of the antenna 360) to a three-dimensional frame of reference of the transit craft 150. As used herein, terms like "coarsely aligns," or the like, generally means that installation does not intend to achieve a high level of precision (even if a precision alignment accidentally results), and that the novel techniques described herein do not rely on the installation achieving any particular precision of physical alignment. For example, installers can securely couple (e.g., bolt) the craft antenna system 155 to the transit craft 150 via the mounting structures 325 so that the radome 320 faces generally in the correct direction relative to the transit craft 150 and sits generally level relative to the transit craft 150. Even if such an installation accidentally results in very precise physical alignment (i.e., or regardless of whatever the resulting physical alignment happens to be), the physical installation would still be considered herein as coarsely aligned because no special physical alignment tools were used to ensure or confirm any particular precision of physical alignment.

In the alignment mode, embodiments of the antenna control unit 335 compute initial values of the antenna steering vectors for pointing the antenna 360 to the RF node 215, the computing being based on determining an initial node geographic location of the RF node 215 from the ephemeris data (e.g., as obtained from the data store 340) and based on receiving an initial craft attitude of the transit craft 150 from the OCNS 310 (e.g., via the craft data interface 315). Computing the initial values can be further based on receiving an initial geographic location of the transit craft 150 (i.e., an initial craft geographic location) and/or of the craft antenna system 155 (e.g., received from the OCNS 310 via the craft data interface 315). The antenna control unit 335 can then direct the antenna pointer 345 (e.g., via its output data interface) to point the antenna 360 based on the initial values of the antenna steering vectors. With the antenna 360 pointed based on the initial values of the antenna steering vectors, the antenna control unit 335 can find and lock on to an RF signal received via the antenna 360 from the RF node 215. As noted above, in the alignment mode, the steering vectors and resulting antenna pointing are based on the coarse physical alignment between the three-dimensional frame of reference of the craft antenna system 155 and that of the transit craft 150. As such, the signal quality (e.g., SNR) of the received RF signal can be limited by the accuracy of the coarse physical alignment.

The antenna control unit 335 can proceed to execute automated closed-loop tracking of the RF signal to find optimized values of the antenna steering vectors based on maximizing a signal quality of the RF signal. In some embodiments, the antenna control unit 335 directs the antenna pointer 345 to make iterative adjustments to the antenna pointing (e.g., using dithering, or any suitable technique), while monitoring changes in the signal quality of the received RF signal. The closed-loop tracking continues to execute until a pointing direction is found that yields a maximum signal quality, such as a highest SNR. Upon conclusion of the closed-loop tracking, the pointing of the antenna 360 corresponds to optimized values for the antenna steering vectors.

Assuming that the coarse physical alignment did not happen to result in a precise physical alignment, there will be a misalignment between initial attitude of the craft antenna system 155 (on which the optimized values of the antenna steering vectors are based) and the initial attitude of the transit craft 150 (on which the initial values of the antenna steering vectors are based). Embodiments of the antenna control unit 335 compute an alignment mapping based on the misalignment between the initial attitude of the craft antenna system 155 (e.g., as derived from the optimized antenna pointing direction) and the initial attitude of the transit craft 150 (e.g., as received from the OCNS 310. The alignment mapping can be represented in any suitable manner. In one implementation, the alignment mapping is a translation vector between a physical three-dimensional frame of reference of the transit craft and a physical three-dimensional frame of reference of the craft antenna system. The computed alignment mapping can be output by the antenna control unit 335 for non-volatile storage in the data store 340.

In the dynamic pointing mode, embodiments of the antenna control unit 335 exploit the stored alignment mapping to dynamically update pointing of the antenna 360 during transit of the transit craft to maintain tracking of the RF signal. For example, embodiments can continuously or periodically update the pointing of the antenna 360 in the dynamic pointing mode. The antenna control unit 335 can determine a present node geographic location of the RF node 315 based on the stored ephemeris data (e.g., previously stored in the data store 340, or newly updated ephemeris data loaded to the data store 340). The antenna control unit 335 can also determine a present antenna attitude based on receiving a present craft attitude of the transit craft 150 from the OCNS 310 and applying the alignment mapping to the present craft attitude. The antenna control unit 335 can also determine a present antenna geographic location based on receiving a present craft geographic location of the transit craft 150 from the OCNS 310. Embodiments of the antenna control unit 335 proceed to compute present values of the antenna steering vectors based on the present node geographic location and the present antenna attitude (e.g., and the present antenna geographic location). The antenna control unit 335 can then direct the antenna pointer (e.g., via its output data interface) to point the antenna 360 based on the present values of the antenna steering vectors.

FIG. 4 shows a flow diagram of an illustrative method 400 for operating a craft antenna system in an alignment mode, according to embodiments described herein. In some embodiments, the method 400 is implemented using embodiments of the craft antenna system 155 described above. Embodiments begin at stage 404 by installing a craft antenna system physically on a transit craft so that a three-dimensional frame of reference of the craft antenna system is coarsely aligned to a three-dimensional frame of reference of the transit craft. At stage 408, embodiments can communicatively couple the craft antenna system with an on-craft navigation system (OCNS) of the transit craft.

At stage 412, embodiments can compute initial values of antenna steering vectors for pointing an antenna of the craft antenna system to an RF node of an RF communication network. The computing at stage 412 can be based on determining an initial node geographic location of the RF node from stored ephemeris data, and based on receiving an initial craft attitude of the transit craft from the OCNS. The computing at stage 412 can be further based on receiving an initial craft location (i.e., geographic location) of the transit craft. At stage 416, embodiments can point the antenna based on the initial values of the antenna steering vectors. At stage 420, with the antenna pointed according to the initial values of the antenna steering vectors, embodiments can find and lock on to an RF signal received by the antenna from the RF node.

At stage 424, embodiments can execute automated closed-loop tracking of the RF signal to find optimized values of the antenna steering vectors based on maximizing a signal quality of the RF signal. The optimized values can indicate an initial antenna attitude (e.g., and location) of the antenna. In some embodiments, the signal quality includes signal-to-noise ratio (SNR), such that maximizing a signal quality of the RF signal involves finding a maximum SNR of the RF signal. As illustrated, the closed-loop tracking can involve an iterative loop. At each iteration, the antenna is pointed to a new candidate pointing direction in stage 424, and a determination is made at stage 428 as to whether the candidate antenna steering vectors corresponding to the candidate pointing direction have yielded a maximum signal quality. The selection of each new candidate pointing direction can be according to a dithering algorithm, or the like; and the determination at stage 428 can be based on any suitable optimization algorithm. For example, a series of iterations may pass repeat certain candidate antenna pointing directions, even passing through an optimal antenna pointing direction one or more times, before arriving at a determination of which antenna pointing direction yields the maximum signal quality (and proceeding to stage 432, accordingly).

At stage 432, embodiments can compute an alignment mapping based on a misalignment between the initial antenna attitude (e.g., and location) and the initial craft attitude (e.g., and location). For example, the computation can be based on a difference or misalignment between the initial antenna steering vectors and the optimized antenna steering vectors. Embodiments can further (e.g., also at stage 432) store the alignment mapping in a non-volatile data store accessible to the craft antenna system. As described herein, the stored alignment mapping can be used by the craft antenna system to operate in the dynamic pointing mode.

FIG. 5 shows a flow diagram of an illustrative method 500 for operating a craft antenna system in a dynamic pointing mode, according to embodiments described herein. In some embodiments, the method 500 is implemented using embodiments of the craft antenna system 155 described above. The method 500 relies on having previously computed and stored an alignment mapping, such as in stage 432 of FIG. 4. The method 500 can be performed repeatedly in a substantially continuous or periodic manner, such as whenever the transit craft is in transit (e.g., and/or as a default condition, such as whenever the craft antenna system is not operating in the alignment mode).

Embodiments of the method 500 begin at stage 504 by determining a present node geographic location of the RF node based on the stored ephemeris data. A stage 508, embodiments can determine a present antenna attitude based on receiving a present craft attitude of the transit craft from the OCNS and applying the alignment mapping to the present craft attitude. Some embodiments can further determine a present antenna geographic location, such as based on receiving a present craft geographic location of the transit craft from the OCNS. At stage 512, embodiments can compute present values of the antenna steering vectors based on the present node geographic location and the present antenna attitude (e.g., and the present geographic location of the craft and/or of the antenna). At stage 516, embodiments can update pointing of the antenna to maintain tracking of the RF signal according to the updated present values of the antenna steering vectors.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. An antenna steering subsystem comprising:

a data store, located on-board within a radome of a transit craft, having, stored in non-volatile memory, ephemeris data for a RF node of a RF communication system, wherein the ephemeris data is loaded to the data store for the RF node prior to the transit craft being in transit;

an antenna pointer, within the radome of the transit craft, to point an antenna based on antenna steering vectors; and an antenna controller, within the radome of the transit craft, in communication with the data store, having an input data interface to communicatively couple with an on-craft navigation system (OCNS) of the transit craft, having an output data interface to couple with the antenna pointer, and configured to operate in an alignment mode, to:

compute initial values of the antenna steering vectors for pointing an antenna to the RF node, the computing being based on determining an initial node geographic location of the RF node from the ephemeris data, and based on receiving an initial craft attitude of the transit craft from the OCNS;

direct the antenna pointer, via the output data interface, to point the antenna based on the initial values of the antenna steering vectors;

find and lock on to an RF signal received via the antenna from the RF node;

execute automated closed-loop tracking of the RF signal to find optimized values of the antenna steering vectors based on maximizing a signal quality of the RF signal, the optimized values indicating an initial antenna attitude of the antenna;

compute an alignment mapping based on a misalignment between the initial antenna attitude and the initial craft attitude; and output the alignment mapping for non-volatile storage in the data store.

2. The antenna steering subsystem of claim 1, wherein the antenna controller is configured to compute the initial values further based on receiving an initial craft geographic location of the transit craft from the OCNS.

3. The antenna steering subsystem of claim 1, wherein the antenna controller is configured to compute the alignment mapping based on a difference between the optimized values of the antenna steering vectors and the initial values of the antenna steering vectors corresponding to the misalignment between the initial antenna attitude and the initial craft attitude.

4. The antenna steering subsystem of claim 1, wherein: the antenna pointer is configured to drive a multi-axis structure configured to mechanically point the antenna according to the antenna steering vectors.

5. The antenna steering subsystem of claim 1, wherein: the antenna is a phased array antenna; and the antenna pointer is configured to control phase shifters of the phased array antenna to electrically point the antenna by pointing an antenna beam output of the antenna according to the antenna steering vectors.

6. The antenna steering subsystem of claim 1, wherein the antenna controller is further configured to operate, in a dynamic pointing mode, to dynamically update pointing of the antenna during transit of the transit craft to maintain tracking of the RF signal by:
   determining a present node geographic location of the RF node based on the stored ephemeris data;
   determining a present antenna attitude based on receiving a present craft attitude of the transit craft from the OCNS and applying the alignment mapping to the present craft attitude;
   computing present values of the antenna steering vectors based on the present node geographic location and the present antenna attitude; and
   directing the antenna pointer, via the output data interface, to point the antenna based on the present values of the antenna steering vectors.

7. The antenna steering subsystem of claim 6, wherein the antenna controller is further configured to operate, in the dynamic pointing mode, to dynamically update pointing of the antenna during transit of the transit craft to maintain tracking of the RF signal further by:
   determining a present antenna geographic location based on receiving a present craft geographic location of the transit craft from the OCNS,
   wherein the computing the present values of the antenna steering vectors is further based on the present antenna geographic location.

8. The antenna steering subsystem of claim 1, wherein the maximizing the signal quality comprises maximizing a signal-to-noise ratio (SNR) of the RF signal.

9. The antenna steering subsystem of claim 1, wherein the input data interface comprises an ARINC 429 receive-only interface to communicatively couple with the OCNS of the transit craft.

10. The antenna steering subsystem of claim 1, wherein the alignment mapping is a translation vector between a physical three-dimensional frame of reference of the transit craft and a physical three-dimensional frame of reference associated with the antenna.

11. The antenna steering subsystem of claim 1, wherein the initial craft attitude indicates a present pitch, roll, and yaw of the transit craft as reported by the OCNS.

12. The antenna steering subsystem of claim 1, wherein the RF node is a communication satellite.

13. The antenna steering subsystem of claim 1, wherein the transit craft is an aircraft.

14. A craft antenna system comprising:
   a radome;
   an antenna housed within the radome;
   a mounting structure configured to physically mount the radome and the antenna on a transit craft so as to coarsely align a three-dimensional frame of reference of the antenna to a three-dimensional frame of reference of the transit craft; and
   the antenna steering subsystem of claim 1 at least partially housed within the radome.

15. A method comprising:
   installing a craft antenna system physically on a transit craft within a radome of the transit craft, so that a three-dimensional frame of reference of the craft antenna system is coarsely aligned to a three-dimensional frame of reference of the transit craft;
   communicatively coupling the craft antenna system with an on-craft navigation system (OCNS) of the transit craft;
   computing, by an antenna control unit within the radome of the transit craft, initial values of antenna steering vectors for pointing an antenna of the craft antenna system to an RF node of an RF communication network, the computing being based on determining an initial node geographic location of the RF node from stored ephemeris data, and based on receiving an initial craft attitude of the transit craft from the OCNS, wherein the stored ephemeris data is stored using a data store within the radome of the transit craft for the RF node prior to the transit craft being in transit;
   pointing, by the antenna control unit within the radome of the transit craft, the antenna based on the initial values of the antenna steering vectors;
   finding and locking on to an RF signal received by the antenna from the RF node;
   executing, by the antenna control unit within the radome of the transit craft, automated closed-loop tracking of the RF signal to find optimized values of the antenna steering vectors based on maximizing a signal quality of the RF signal, the optimized values indicating an initial antenna attitude of the antenna;
   computing an alignment mapping based on a misalignment between the initial antenna attitude and the initial craft attitude; and
   storing the alignment mapping in a non-volatile data store accessible to the craft antenna system.

16. The method of claim 15, wherein the computing initial values is further based on receiving an initial craft geographic location of the transit craft.

17. The method of claim 15, further comprising, subsequent to the storing:
   updating pointing of the antenna during transit of the transit craft to maintain tracking of the RF signal by:
      determining a present node geographic location of the RF node based on the stored ephemeris data;
      determining a present antenna attitude based on receiving a present craft attitude of the transit craft from the OCNS and applying the alignment mapping to the present craft attitude; and
      computing present values of the antenna steering vectors based on the present node geographic location and the present antenna attitude.

18. The method of claim 17, further comprising:
   determining a present antenna geographic location based on receiving a present craft geographic location of the transit craft from the OCNS,
   wherein the computing the present values of the antenna steering vectors is further based on the present antenna geographic location.

19. The method of claim 15, wherein the maximizing the signal quality comprises maximizing a signal-to-noise ratio (SNR) of the RF signal.

20. The method of claim 15, wherein the alignment mapping is a translation vector between the three-dimensional frame of reference of the transit craft and the three-dimensional frame of reference of the craft antenna system.

* * * * *